July 16, 1968     J. P. CRISLER ET AL     3,393,032
CORROSIVE-RESISTANT AND HERMETICALLY SEALED CONTROLLED
ATMOSPHERE MICROSCOPE BOX AND MICROSCOPE
Filed Dec. 21, 1964

Joseph P. Crisler
Frederick E. Brinckman, Jr
Elizabeth A. Whitman
           INVENTORS.

BY

ATTORNEY.

AGENT.

United States Patent Office
3,393,032
Patented July 16, 1968

3,393,032
CORROSIVE-RESISTANT AND HERMETICALLY SEALED CONTROLLED ATMOSPHERE MICROSCOPE BOX AND MICROSCOPE
Joseph P. Crisler, Indian Head, Frederick E. Brinckman, Jr., Oxon Hill, and Elizabeth A. Whitman, La Plata, Md., assignors to the United States of America as represented by the Secretary of the Navy
Filed Dec. 21, 1964, Ser. No. 420,227
1 Claim. (Cl. 350—67)

ABSTRACT OF THE DISCLOSURE

A hermetically sealed microscope dry box in which microscopic experiments and tests are conducted under environmentally controlled conditions where flexible gloves for manipulating a specimen therein are provided and where a flexible diaphragm attached to the dry box has an opening through which the microscope extends. The diaphragm forms a seal with the microscope body while the gloves form a seal with the box and thereby retaining the controlled atmosphere within the box.

---

The invention described herein may be manufactured and used by or for the Government of the United States of America for governmental purposes without the payment of any royalties thereon or therefor.

This invention relates to the microscopic study of small quantities of special materials and is more particularly related to a device providing an enclosure for a microscope and having therein a controlled atmosphere for use in conducting experiments and tests upon certain special materials which have exhibited tendencies toward undesirable reactions, decomposition or deterioration when the same experiments are carried out under normal ambient atmospheric conditions.

It is believed that, prior to the instant invention, microscopical techniques employed in the characterization and identification of such materials as represented by pyrophoric organometallic compounds, highly moisture-sensitive substances, or very toxic chemical warfare agents have been severely restricted by existing equipment in that adequate environmental control for the protection both of the specimen and the observer are not inherent therein. The dust-boxes and plastic bag coverings heretofore used as microscope enclosures for the purpose stated do not provide safe and reliable, nor controlled, inert, dry and reproducible atmospheric environments as are essential for the effective study of the afore-described substances, and they suffer further in that they sharply constrain the ease of manipulation necessarily required within the test equipment.

It is the purpose therefore of the present invention to eliminate many of the above-mentioned problems by providing an effective and convenient means by which laboratory microscopes of appropriate design and features may be incorporated into a device whereby environmental control may be reproducibly established, that is, a device having means for enclosing a microscope within an inert atmosphere such as, for example, nitrogen, helium or argon, whose dewpoint and oxygen-content can be maintained at desirable levels. Such a device, or system, will provide standard utilization of microscopical optics with the unique feature of controlling the ambient environment.

Thus it is the primary object of this invention to provide a method for conducting a microscopic examination of a given substance under a controlled environment.

Another object of the present invention is to provide a device for controlling the ambient environment about a standard laboratory microscope.

Still another object of the invention is the provision of a controlled atmosphere microscope dry box system which provides good visibility and permits ready manipulation within the interior to thereby enable examination of substances heretofore impossible.

The accomplishment of the foregoing objects and others along with the features and advantages of the invention, will be readily apparent from the following detailed description when considered in connection with the accompanying drawings, in which.

Figure 1:
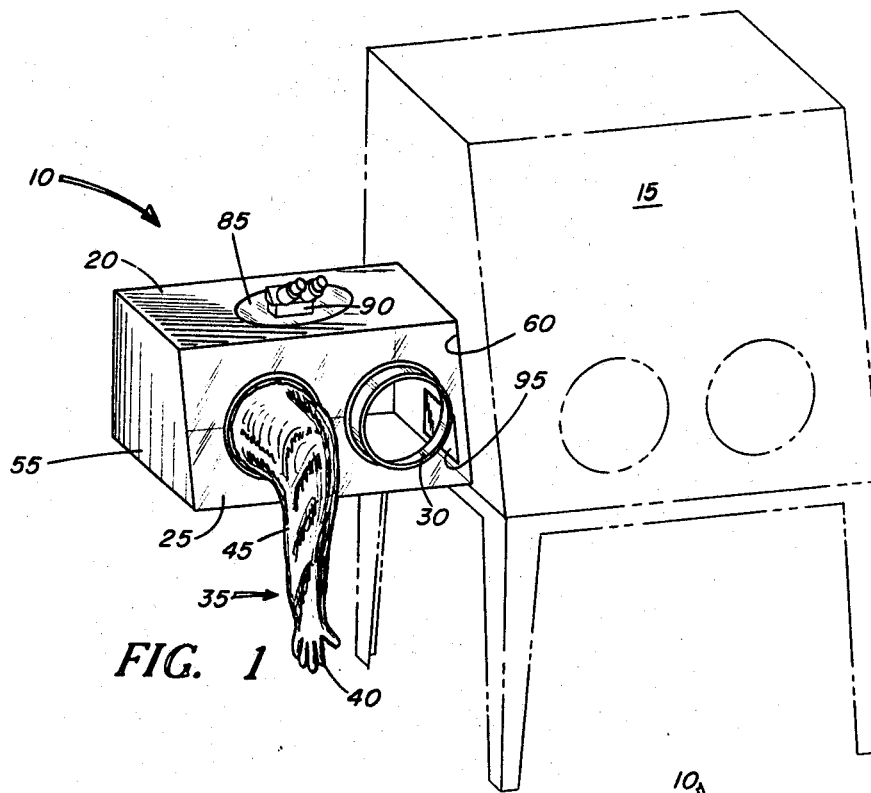
FIG. 1 is a perspective view of a microscopic dry box unit according to the present invention shown attached to a commercial dry box illustrated in phantom.
Figures 2, 3:
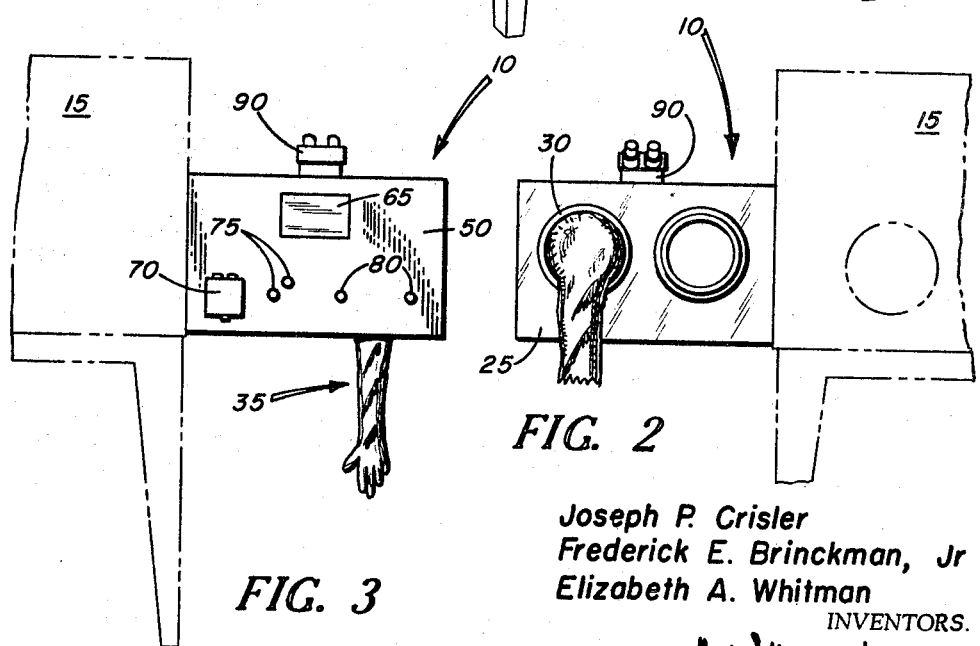
FIG. 3 is a back view, partly broken away, of the dry box system of FIG. 1 and illustrating circulation ports and electrical connection means provided within the microscopic dry box unit.
FIG. 2 is a front view of the apparatus as shown in FIG. 3 and illustrating the glove-port flanges mounted therein.

Referring now to the drawings, wherein like reference numerals designate like parts throughout the several views, a controlled atmosphere microscope dry box unit formed in accordance with the present invention and generally indicated by the reference numeral 10 is shown in FIG. 1 as being attached to one side of a hermetically sealed dry box 15 which is combined with a highly efficient purification system (not illustrated) capable of constantly maintaining an inert atmosphere therein at a desirable level. Commercially available dry-lab equipment of this character which has been found to be suitable for the purposes described is manufactured by the D. L. Herring Corporation of Van Nuys, California, now the Vacuum/Atmosphere Corporation of North Hollywood, California, and is available therefrom under the trade names of Dri-Lab and Tri-Train. This equipment will maintain an inert atmosphere in the range of part per million of moisture and oxygen, and it includes moisture remover and oxygen remover furnaces, each having self-contained regeneration. Drying is accomplished therein by a desiccant and a molecular sieve, and an acid trap, a positive displacement circulation pump and a vacuum pump are also included. Pressure is controlled either with a foot switch or by an automatic safety switch.

The specially fabricated microscope dry box unit 10, with the exception of part of the top panel 20, is made of corrosive-resistant metal, such as for example, aluminum, and of safety plate-glass and Plexiglas. The front panel 25 is made of full-view Plexiglas provided with a pair of access openings therein which are illustrated as being of ciruclar shape, in each of which there is mounted a rigid and flanged metal ring, such as an aluminum ring 30, adapted to receive in sealed relationship the open end of a long, flexible rubber glove indicated generally by the numeral 35, having a hand portion 40 and an arm or gauntlet portion 45. When not in use, the gloves preferably may be permitted to hang outside the unit as illustrated in FIG. 1. However, when it is desired to use the same, the operator merely inserts his hands in the gloves, running the latter right side out to position the arms of the operator within the unit 10.

The rear panel 50, the floor and the end panels 55 and 60 of unit 10 are made of corrosive-resistant aluminum. In the rear panel 50 there is a small opening which is provided with a gasket-sealed closure 65 that is fitted with pipe couplings (not shown). A dual outlet electrical box 70, additional pipe couplings 75 and circulation ports 80 are also provided within rear panel 50 for purposes to be hereinafter described.

The top panel 20 is made of safety plate-glass and includes a central opening having fitted therein a thin, transparent membrane or diaphragm 85, which may be composed of Teflon, butyl or some other suitable plastic material, and which is adapted to accommodate a commercial microscope 90 of appropriate design, providing a positive seal when fitted thereto between the body and the stand of the microscope. The plastic diaphragm 85 is so fitted into the top panel 20 that it may be readily replaced, the shape, form and type of diaphragm fitted therein being dependent upon the model of the microscope to be used. Thus the shape and size of the opening to be cut from the diaphragm is to conform to the particular configuration and dimensions of the microscope body.

Entrance to the microscope dry box unit 10 is through a hatch 95 mounted in the end panel 60 common with the side wall of the dry box 15 to which unit 10 is attached, thus providing for environmental control within the unit 10 by the aforedescribed commercially available Dri-Lab and permitting the movement therebetween of some of the test equipment contained therein, such as, for example, electrical heaters, temperature sensing elements and the like. Thus it may be seen that means have been provided for maintaining a controlled, inert, dry and reproducible atmosphere for the purpose of microscopic study of air and/or moisture sensitive or pyrophoric substances through the combination of commercially available dry box equipment with a novel microscope dry box unit.

It is contemplated that the two boxes may be operated independently rather than as a single unit as described. Provision therefore has been made, in the form of couplings 75 and circulation ports 80 in the rear panel 50 of the unit 10, so that circulation of an inert gas through the microscope dry box unit 10 by a commercial gas purification system may be achieved either in train with or independently of the Dri-Lab, or standard dry box 15.

It may be seen, therefore, that with the present invention an apparatus has been provided which enables the microscopic examination and analysis of substances under controlled atmospheric conditions and furthermore establishes the novel use of microscopical techniques in areas heretofore inaccessible because of environmental limitations.

Obviously many modifications and variations of the present invention are possible in the light of the above teachings. It is therefore to be understood that within the scope of the appended claim the invention may be practiced otherwise than as specifically described.

What is claimed is:
1. A hermetically sealed microscope dry box comprising:
   a rigid, box-like enclosure having a rear wall, a front wall, two side walls, a top wall and a bottom wall formed of corrosive resistant material,
   said front wall formed of a glass material and having a pair of spaced access openings therein,
   an annular glove-supporting member positioned in each of said access openings and secured to the front wall in positive sealed relationship therewith, a flexible glove attached to each of said supporting members in a positive sealed relationship therewith,
   said top wall formed of safety plate-glass and having a central opening therein,
   a thin transparent membrane plastic diaphragm removably fitted into a positive sealed relationship with said central opening and having an opening therein,
   a microscope mounted within said top wall and projecting through said opening in said diaphragm into the chamber formed by said walls,
   said diaphragm forming a positive seal with said microscope,
   coupling and circulating means on one of said walls for connecting the interior of said enclosure to a source for independent environmentally controlling the interior thereof and a normally closed hatch means on one of said sides for communicating with a controlled environment chamber whereby a specimen is moved therethrough and wherein the specimen is maintained under a predetermined controlled environment.

References Cited
UNITED STATES PATENTS

| | | | |
|---|---|---|---|
| 2,473,033 | 6/1949 | Letac | 128—1.02 |
| 2,600,240 | 6/1952 | Grieb | 128—1.02 |
| 2,688,959 | 9/1954 | Emerson | 128—1.02 |
| 2,977,956 | 4/1961 | Smith et al. | 128—1.02 |

FOREIGN PATENTS

| | | |
|---|---|---|
| 976,045 | 10/1945 | Great Britain. |

DAVID H. RUBIN, *Primary Examiner.*

P. R. GILLIAM, *Assistant Examiner.*